US011933092B2

(12) United States Patent
Zhao et al.

(10) Patent No.: US 11,933,092 B2
(45) Date of Patent: Mar. 19, 2024

(54) MOUNTING ASSEMBLY FOR DOOR LOCK

(71) Applicant: SimpliSafe, Inc., Boston, MA (US)

(72) Inventors: Yong Zhao, Medford, MA (US); Heath Allen Marvin, Woburn, MA (US); Chaim Carmiel Futran, Cambridge, MA (US)

(73) Assignee: SimpliSafe, Inc., Boston, MA (US)

( * ) Notice: Subject to any disclaimer, the term of this patent is extended or adjusted under 35 U.S.C. 154(b) by 1112 days.

(21) Appl. No.: 16/539,214

(22) Filed: Aug. 13, 2019

(65) Prior Publication Data

US 2021/0047861 A1 Feb. 18, 2021

(51) Int. Cl.
*E05B 9/08* (2006.01)

(52) U.S. Cl.
CPC ........... *E05B 9/08* (2013.01); *E05Y 2900/132* (2013.01)

(58) Field of Classification Search
CPC ........ E05B 9/08; E05B 47/0012; E05B 47/02; E05B 2047/0091; E05B 15/02; E05Y 2900/132
See application file for complete search history.

(56) References Cited

U.S. PATENT DOCUMENTS 3,397,905 A 8/1968 Banse
4,156,541 A * 5/1979 Babb, Jr. ................. E05C 9/025 70/108
4,845,490 A 7/1989 Ward et al.
5,369,913 A 12/1994 Brickner
5,421,178 A 6/1995 Hamel et al.
5,473,236 A 12/1995 Frolov
5,474,348 A 12/1995 Palmer et al.
5,628,216 A 5/1997 Qureshi et al.
5,640,863 A 6/1997 Frolov
5,646,605 A 7/1997 Leonaggeo et al.
5,712,626 A 1/1998 Andreou et al.
5,782,118 A 7/1998 Chamberlain et al.
5,857,365 A 1/1999 Armstrong
5,931,430 A 8/1999 Palmer
6,076,870 A 6/2000 Frolov
(Continued)

FOREIGN PATENT DOCUMENTS

AU 2011224106 A1 4/2012
CN 104213759 A 12/2014
(Continued)

OTHER PUBLICATIONS

International Preliminary Report on Patentability for International Application No. PCT/US2020/045880, dated Feb. 24, 2022.
(Continued)

*Primary Examiner* — Michael P Ferguson
*Assistant Examiner* — Thomas L Neubauer
(74) *Attorney, Agent, or Firm* — Wolf, Greenfield & Sacks, P.C.

(57) ABSTRACT

A door lock that includes a latch adapted to be moved manually relative to a mounting bracket and lock body to attach the body to the mounting bracket. The latch may be movably mounted to the body, and arranged to capture a portion of the mounting bracket between the latch and the body. A detent may be used to hold the latch in the closed position relative to the body, and a spring may be adapted to bias the latch away from the body.

15 Claims, 15 Drawing Sheets

(56) References Cited

U.S. PATENT DOCUMENTS 6,330,817 B1 12/2001 Frolov
6,354,121 B1 3/2002 Frolov
6,442,986 B1 9/2002 Russell et al.
D552,964 S 10/2007 Bogdanov et al.
9,685,017 B2 6/2017 Johnson
2001/0025517 A1 10/2001 Bates et al.
2002/0095958 A1 7/2002 Bates et al.
2003/0179074 A1 9/2003 Palomaki et al.
2004/0177663 A1 9/2004 Walsh, III et al.
2005/0050928 A1 3/2005 Frolov et al.
2005/0167995 A1 8/2005 Wallis et al.
2005/0179267 A1 8/2005 Cote et al.
2006/0101878 A1 5/2006 Dickhans et al.
2007/0157684 A1 7/2007 Bogdanov et al.
2007/0204663 A1 9/2007 Lee
2007/0209413 A1 9/2007 Dobbs
2008/0142593 A1 6/2008 Walsh et al.
2008/0169655 A1 7/2008 Gomez Gonzalez
2008/0236213 A1 10/2008 Blanch
2009/0027197 A1 1/2009 Frolov
2009/0277232 A1 11/2009 Walsh, III
2009/0282877 A1 11/2009 Laverty et al.
2010/0089109 A1 4/2010 Bliding et al.
2010/0257906 A1 10/2010 Sorensen et al.
2010/0294008 A1 11/2010 Bogdanov et al.
2011/0036131 A1 2/2011 Chiou et al.
2011/0067464 A1 3/2011 Chiou et al.
2011/0203331 A1 8/2011 Picard et al.
2012/0061974 A1 3/2012 Laverty et al.
2012/0212001 A1 8/2012 Benitez et al.
2012/0324967 A1 12/2012 Goren et al.
2013/0031940 A1 2/2013 Romero
2013/0039715 A1* 2/2013 Daykin ................. F16B 37/041 411/21
2013/0061644 A1 3/2013 Trent et al.
2013/0192316 A1 8/2013 McKibben et al.
2013/0318519 A1 11/2013 Coolidge
2013/0335222 A1 12/2013 Comerford et al.
2014/0109633 A1 4/2014 Romero
2014/0109634 A1 4/2014 Almomani et al.
2014/0113563 A1 4/2014 Almomani et al.
2014/0118107 A1 5/2014 Almomani
2014/0157842 A1 6/2014 Almomani et al.
2014/0159392 A1 6/2014 Tsai et al.
2014/0165673 A1 6/2014 Tyner et al.
2014/0250956 A1 9/2014 Chong
2014/0260448 A1 9/2014 Beck et al.
2014/0260449 A1 9/2014 Uyeda et al.
2014/0260451 A1 9/2014 Quach et al.
2014/0265359 A1 9/2014 Cheng et al.
2014/0292001 A1 10/2014 Nunez et al.
2015/0184425 A1 7/2015 Ellis et al.
2015/0240528 A1 8/2015 Mani et al.
2015/0240529 A1 8/2015 Dore Vasudevan et al.
2015/0247345 A1 9/2015 Carpenter et al.
2015/0281228 A1 10/2015 Rettig et al.
2015/0361704 A1 12/2015 Larsen et al.
2016/0040452 A1 2/2016 Ku
2016/0060904 A1 3/2016 Dore Vasudevan et al.
2016/0115720 A1 4/2016 Wong et al.
2016/0145898 A1 5/2016 Ohl et al.
2016/0168888 A1 6/2016 Farias et al.
2016/0186463 A1* 6/2016 Roatis ..................... E05B 1/003 70/266
2016/0253855 A1 9/2016 Lowder
2017/0191287 A1 7/2017 Mittleman et al.
2017/0204637 A1 7/2017 Matyko
2017/0342742 A1 11/2017 Snodgrass
2017/0342750 A1 11/2017 Hiramine
2018/0061163 A1 3/2018 Ku
2018/0108228 A1 4/2018 Lovejoy
2018/0320412 A1 11/2018 Matosian
2018/0320413 A1 11/2018 Wong
2018/0340352 A1 11/2018 Compton
2019/0019365 A1 1/2019 Lee
2019/0211581 A1* 7/2019 Roup ........................ E05B 9/08
2019/0257116 A1 8/2019 Coster et al.
2019/0309539 A1 10/2019 Mukundala et al.
2019/0383057 A1 12/2019 Larson
2020/0002973 A1 1/2020 Hill
2020/0011088 A1 1/2020 Harris
2020/0011090 A1 1/2020 Ku et al.
2020/0032551 A1 1/2020 Holmes et al.
2020/0071955 A1 3/2020 Binek et al.
2020/0123808 A1 4/2020 Lovejoy et al.
2020/0149317 A1 5/2020 Seacat et al.
2020/0149320 A1 5/2020 Pfunder
2020/0157851 A1 5/2020 Fodstad et al.
2020/0248484 A1 8/2020 Arlinghaus et al.
2020/0263449 A1 8/2020 Rai et al.
2020/0291678 A1 9/2020 Eickhoff et al.
2021/0040775 A1 2/2021 Kusanale et al.
2021/0054657 A1 2/2021 Luebeck et al.
2021/0079691 A1 3/2021 Sundkvist et al.
2021/0148136 A1 5/2021 Kim et al.
2021/0174620 A1 6/2021 Kusanale et al.
2021/0214970 A1 7/2021 Yang et al.
2021/0348422 A1 11/2021 Kumar et al.

FOREIGN PATENT DOCUMENTS

CN 105545092 A 5/2016
CN 105840003 A 8/2016
CN 206110869 U 4/2017
CN 206903396 U 1/2018
CN 107795195 A 3/2018
CN 207620532 U 7/2018
CN 108643715 A 10/2018
CN 207988685 U 10/2018
CN 110242112 A 9/2019
CN 110388138 A 10/2019
CN 112343426 A 2/2021
CN 112396732 A 2/2021
CN 213774876 U 7/2021
CN 113250536 A 8/2021
DE 41 02 892 A1 8/1992
DE 10 2006 001 478 A1 7/2007
DE 10 2011 081 789 A1 4/2012
DE 20 2013 103 126 U1 7/2013
EA 2 136 019 A2 12/2009
EP 0 505 887 A1 9/1992
EP 2 208 840 A2 7/2010
EP 2 746 497 A2 6/2014
EP 3 599 329 A1 1/2020
GB 2 568 730 A 5/2019
JP 2010-112002 A 5/2010
JP 2011-017242 A 1/2011
JP 2015-202767 A 11/2015
KR 10-2005-0074820 A 7/2005
KR 10-2006-0039712 A 5/2006
KR 20-0468708 Y1 8/2013
KR 20-0484625 Y1 10/2017
KR 10-2018-0083157 A 7/2018
KR 20-0486963 Y1 7/2018
KR 20-2020-0001831 U 8/2020
WO WO 01/12931 A1 2/2001
WO WO 2004/088069 A1 10/2004
WO WO 2007/020623 A2 2/2007
WO WO 2007/065200 A1 6/2007
WO WO 2007/104499 A2 9/2007
WO WO 2012/015135 A1 2/2012
WO WO 2012/116037 A1 8/2012
WO WO 2017/142472 A1 8/2017
WO WO-2017142472 A1 * 8/2017 ............ E05B 47/02
WO WO 2019/018897 A1 1/2019
WO WO 2019/044962 A1 3/2019
WO WO 2019/071306 A1 4/2019
WO WO 2020/123573 A1 6/2020
WO WO 2020/123575 A1 6/2020

(56) References Cited

FOREIGN PATENT DOCUMENTS

| | | | | |
|---|---|---|---|---|
| WO | WO-2020123573 | A1 * | 6/2020 | ......... E05B 47/0012 |
| WO | WO 2021/053435 | A1 | 3/2021 | |
| WO | WO 2021/092660 | A1 | 5/2021 | |

OTHER PUBLICATIONS

International Search Report and Written Opinion for International Application No. PCT/US2020/045880, dated Dec. 8, 2020.

* cited by examiner

MOUNTING ASSEMBLY FOR DOOR LOCK

BACKGROUND

1. Field of Invention

This invention relates to a door lock or other lock control mechanism that is operable to lock and unlock a door or similar structure.

2. Related Art

Electronic door lock actuators, including so-called smart locks that are used to actuate existing door lock mechanisms, are known, e.g., as described in US Patent Application Publication US20170037937. Such door lock arrangements can allow a user to both operate the door lock manually, e.g., by operating a thumb turn, and electronically, e.g., by interacting with the door lock via an electronic device such as a smartphone.

SUMMARY OF INVENTION

In one aspect of the invention, a door lock includes a body adapted to be mounted to a door or other structure that has a component which can be opened and closed, such as a window. Typically, the body is mounted to a movable part of the door, but may be mountable to a door jamb or other stationary element of the door. The body may be mounted to a door or other structure by a mounting bracket adapted to be mounted to the door. For example, the mounting bracket may be screwed or otherwise attached to a door, and the body then attached to the mounting bracket. A latch adapted to be moved manually relative to the mounting bracket and the body to attach the body to the mounting bracket, e.g., allowing a user to attach the body to (and/or remove it from) the mounting bracket by hand and without tools. The rear side of the body may be adapted for positioning adjacent a surface (e.g., in contact with) of a door to which the door lock is mounted. A lock drive may be movably mounted to the body and adapted to move a lock mechanism between locked and unlocked positions. The lock mechanism may include a slidable lock bolt, movable latch or other lock element that, when in a locked position, can prevent or otherwise resist movement of the door from a closed position to an open position. The lock drive may be coupled to the lock mechanism to actuate the lock mechanism based on movement of the lock drive. For example, the lock drive may be coupled to the lock mechanism by a tailpiece or other coupling element so that rotation of the lock drive moves the tailpiece and thus the lock mechanism between lock and unlock positions. A thumb turn may be movably mounted to the body and adapted for manual movement between at least two positions, such as open and closed positions. The thumb turn may be coupled to the lock drive such that movement of the thumb turn moves the lock drive, e.g., so that a user can move the thumb turn to move the lock mechanism between lock and unlock positions. While the lock drive can be moved manually via the thumb turn, the lock drive can be moved by a motorized or other automated drive train arrangement.

In some embodiments, the latch use to attach the body to the mounting bracket may be movably mounted to the body, e.g., the latch may be movable relative to the body in a plane of a door surface to which the mounting bracket is mounted. The latch may be movable relative to the body between open and closed positions, wherein in the open position a portion of the latch is extended laterally from an outer periphery of the body, and in the closed position the latch is positioned within the outer periphery of the body. In some cases, the latch is movable relative to the body to capture a portion of the mounting bracket between the latch and the body. As an example, the mounting bracket may include a plate arranged in a first plane, and a tab attached to the plate and positioned above the first plane. The latch may have a catch to engage the tab to attach the body to the mounting bracket, e.g., by capturing the tab between the latch and the body. The mounting bracket may include a lock mechanism engaging portion that is positioned below the first plane and adapted to secure the mounting bracket to a door to which the door lock is mounted, e.g., by using threaded fasteners that secure the lock mechanism engaging portion to a lock mechanism mounted to a door.

In some embodiments, first and second latches may be provided that are movable toward each other to attach the body to the mounting bracket. For example, the first and second latches may be mounted on opposite sides of the body. The first and second latches may be arranged to be movable toward each other using a thumb and finger of one hand, e.g., by a user squeezing the two latches toward each other to engage the latches with the mounting bracket. In the open position, a portion of the first and second latches may be extended laterally from an outer periphery of the body, e.g., so a user can grip the latches. In the closed position, the first and second latches may be positioned within the outer periphery of the body, e.g., the user may press the latches into a cavity of the body to the outer portions of the latches are flush with or recessed into the body.

A detent may be provided to hold the latch in the closed position (and/or the open position) relative to the body. For example, the detent may include a pin on the latch and a groove on the body, and be arranged such that the pin and groove can engage each other with the latch in the closed position. The latch may be slidably movable relative to the body, and a spring may be adapted to bias the latch away from the body, e.g., the latch may be mounted to a rear side of the body and the spring may bias the latch away from the rear side of the body. This may help position the latch away from a portion of the body so that a tab or other part of the mounting bracket can be received between the latch and body. The latch may be guided in its movement relative to the body, e.g., the body may have a rail or groove to guide movement of the latch relative to the body, and that latch may have a groove or rail to cooperate with the rail or groove of the body. The latch may have an elongated slot to receive a fastener to attach the latch to the body with the elongated slot extending in a same direction as the groove.

Other advantages and novel features of the invention will become apparent from the following detailed description of various non-limiting embodiments when considered in conjunction with the accompanying figures and claims.

BRIEF DESCRIPTION OF THE DRAWINGS

Aspects of the invention are described with reference to the following drawings in which numerals reference like elements, and wherein.

DETAILED DESCRIPTION

Aspects of the invention are described below by way of one or more illustrative embodiments. It should be understood that the illustrative embodiments described are not intended to limit the aspects of the invention, but rather to help show how one or more aspects of the invention may be implemented in a particular example. Also, aspects of the invention may be implemented alone and/or in combination with other aspects of the invention.

Figure 1:
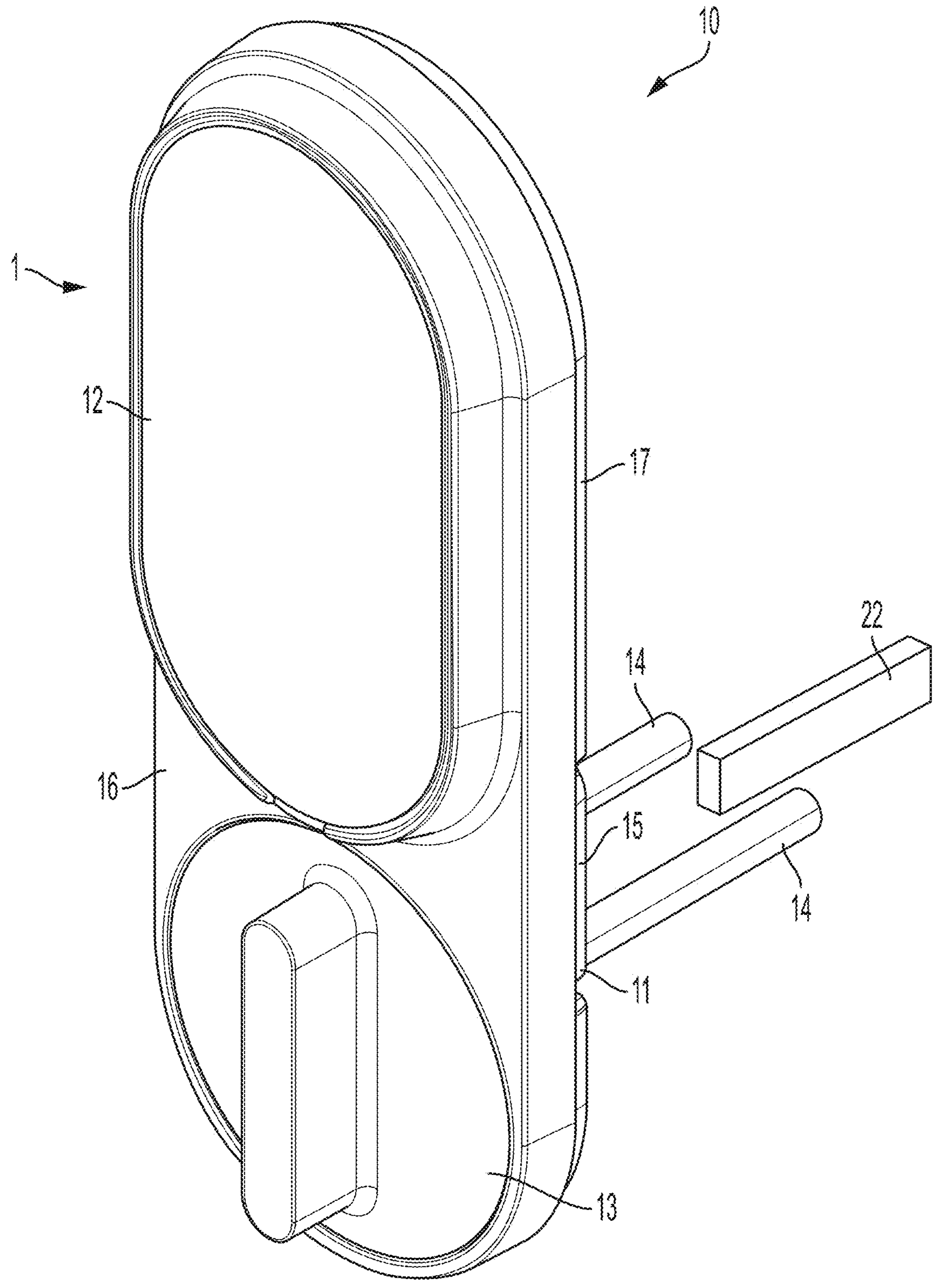
FIG. 1 is a front perspective view of a door lock in an illustrative embodiment.

FIG. 1 shows a perspective view of an illustrative door lock 1 that incorporates one or more aspects of the invention and can be used to move an existing door lock mechanism, such as a sliding bolt or latch, between lock and unlock positions. Embodiments below are described in connection with a door lock mechanism that includes a dead bolt-type lock mechanism in which a bolt element is extended from/retracted into a door structure to lock/unlock the door. However, the door lock 1 may be used with other types of lock mechanisms. In this embodiment, the door lock 1 has a body 10 including a base 17 and a cover plate 16. As discussed in more detail below, the body 10 is mounted to a door, window or other surface to which the door lock 1 is to be attached via a mounting bracket 11. The mounting bracket 11 is initially attached to a door or other surface, and thereafter the body 10 may be attached to the mounting bracket 11 to assemble the door lock 1 on the door. For example, the mounting bracket 11 may have one or more mounting pins 14 that are extended into an opening in a door from an inner side of the door and are secured to a lock cylinder assembly (not shown) on an outer side of the door by screws that engage with the mounting pins 14. Such lock cylinder assemblies are well known in the art and allow a user, for example, to operate the door lock mechanism using a key at the outer side of the door. In other arrangements, the mounting bracket 11 may be mounted over an existing thumb turn of a lock installed on a door. As an example, screws that secure the existing thumb turn of the installed lock may be used to secure the mounting bracket 11 to the door. With the mounting bracket 11 secured to the door or other structure, the base 17 and cover plate 16 of the body 10 may be positioned over and attached to the mounting bracket 11. In this embodiment, the base 17 includes latches 15 that are pivotally mounted to the base 17 and have levers that can be swung outwardly away from the base 17 to allow the base 17 to be positioned over the mounting bracket 11. Thereafter, the latches 15 may be pivoted inwardly so that the latches 15 engage corresponding portions of the mounting bracket 11, thereby attaching the base 17 to the mounting bracket 11. This arrangement can allow for relatively easy and tool-free engagement of the base 17 with the mounting bracket 11.

As is common with many fully manual door locks, the door lock 1 includes a thumb turn 13 that allows a user to manually rotate or otherwise actuate the lock mechanism to move a bolt, latch or other lock element between lock and unlock positions. In this embodiment, the thumb turn 13 may be coupled with a lock tailpiece 22 (either pre-existing or provided with the door lock 1) so that the thumb turn 13 can rotate the tailpiece 22, and thereby move the lock mechanism between lock and unlock positions. Use of a lock tailpiece 22 with the door lock 1 will typically be done when a thumb turn of an existing lock is removed and the door lock 1 is mounted in its place. Where the door lock 1 is mounted over an existing lock thumb turn, the thumb turn 13 of the door lock 1 may be coupled with the existing lock thumb turn, e.g., by providing the door lock 1 with a coupling device that fits over and has a recess to receive the existing thumb turn, as discussed more below.

Figure 2:
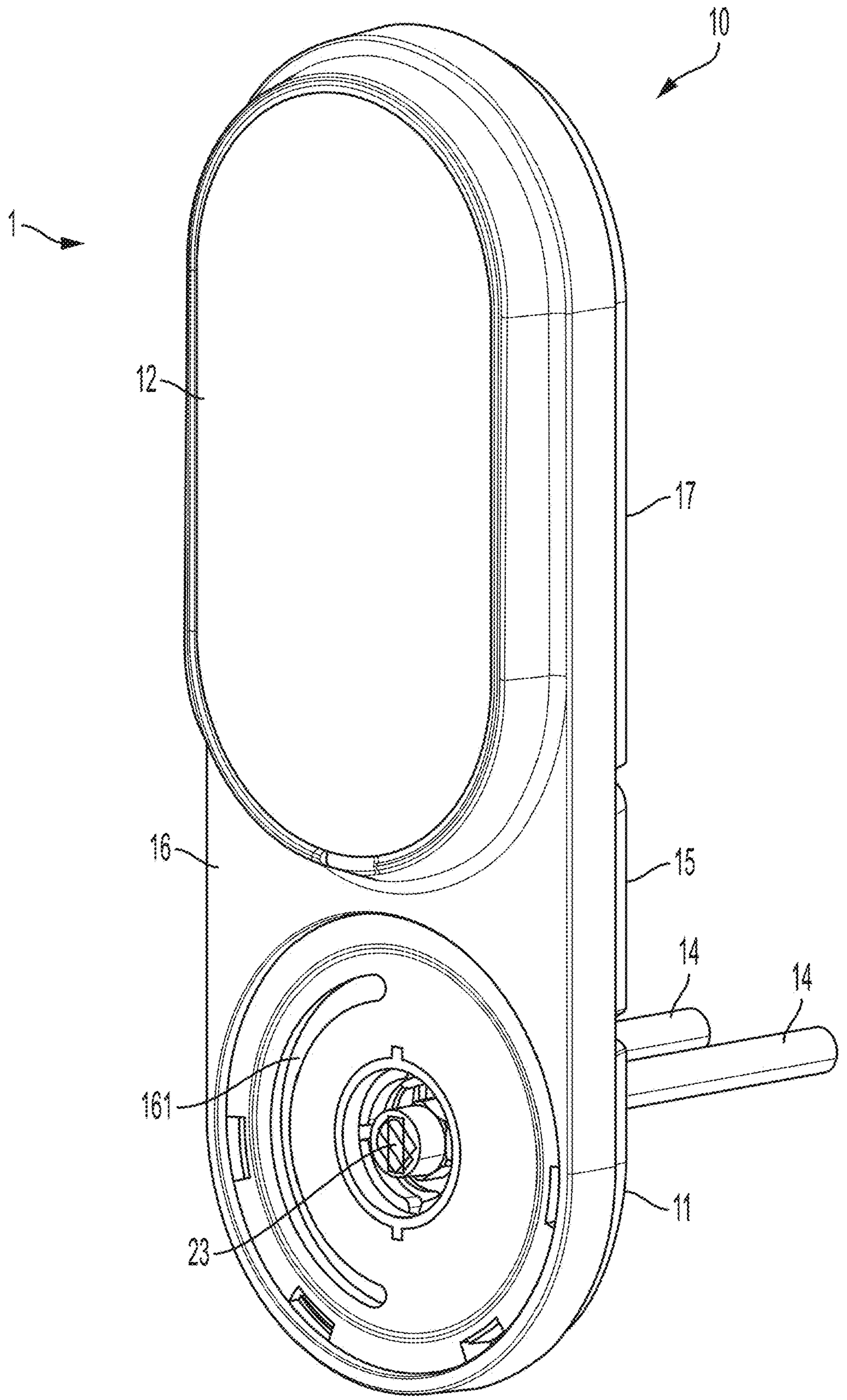
FIG. 2 is a front perspective view of the FIG. 1 door lock with the thumb turn removed.
Figure 3:
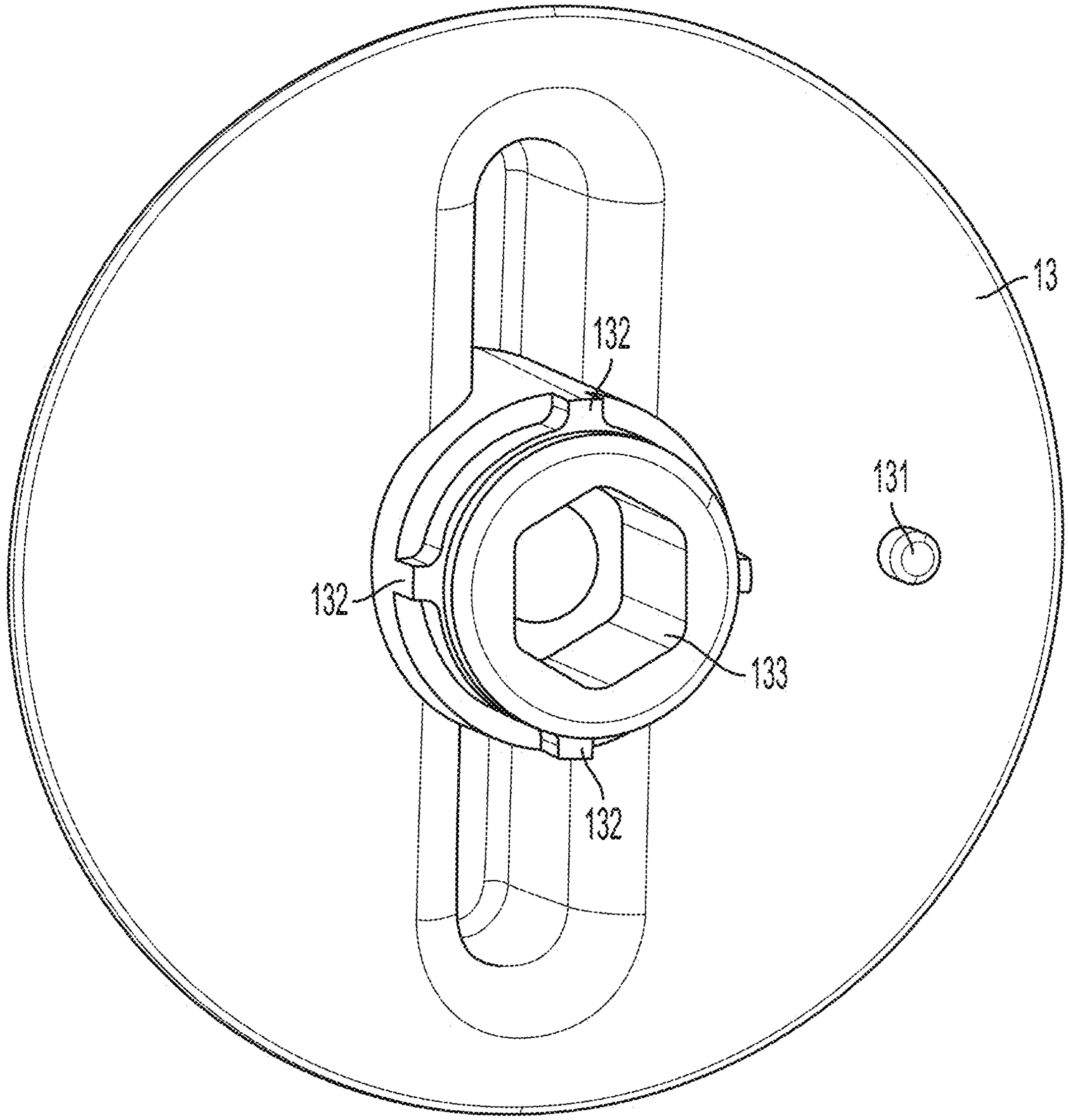
FIG. 3 is a rear perspective view of the thumb turn of the FIG. 1 embodiment.

FIG. 2 shows a view of the door lock 1 with the thumb turn 13 removed. Normally, the thumb turn 13 is mounted to the cover plate 16, but the thumb turn 13 is shown removed in FIG. 2 to illustrate that the range of motion of the thumb turn 13 may be limited. For example, the cover plate 16 may have a recess in which the thumb turn 13 is received when engaged to the cover plate 16. An arcuate slot 161 may be included in the recess and engage with a portion of the thumb turn 13 so that the thumb turn 13 can only be rotated relative to the cover plate 16 to an extent permitted by the slot 161. For example, FIG. 3 shows a rear perspective view of the thumb turn 13 and illustrates a pin 131 that is received in the slot 161. When the thumb turn 13 is mounted to the cover plate 16, the pin 131 moves in the slot 161 as the thumb turn 13 is rotated to actuate the lock mechanism between lock and unlock positions. However, the pin 131 and slot 161 limit the range of motion of the thumb turn 13 relative to the cover plate 16, e.g., in this case to about 180 degrees rotation. Such limitation is not required, however, and the thumb turn 13 need not be limited in its movement relative to the body 10. Alternately, the thumb turn 13 may be limited to a range of motion that is less than 180 degrees, e.g., 90 degrees or less.

Figure 4:
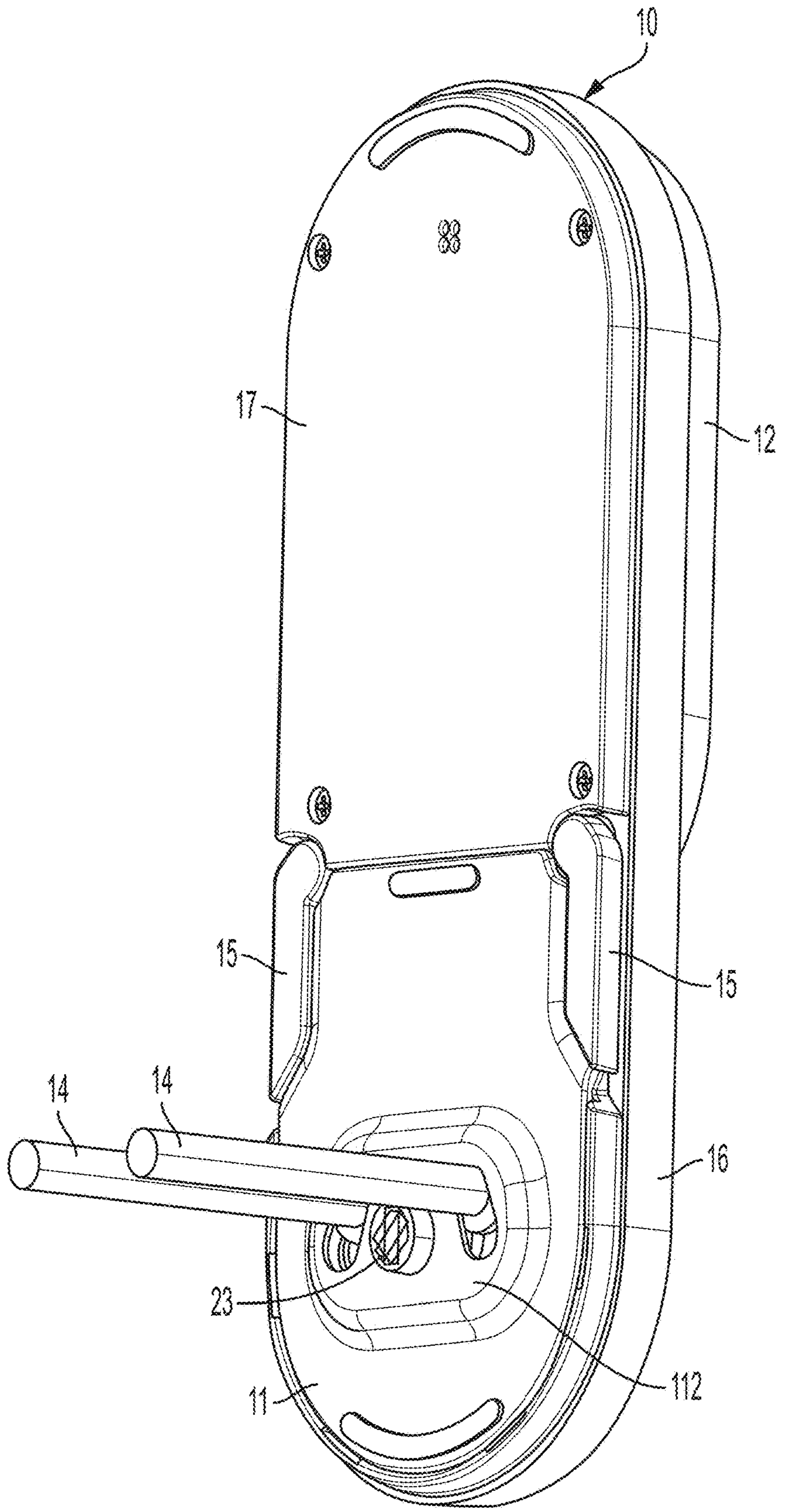
FIG. 4 is a rear perspective view of the FIG. 1 embodiment.

FIG. 4 shows a rear perspective view of the door lock 1, and illustrates a tailpiece receiver 23 that is coupled to the thumb turn 13 and may receive the tailpiece 22 shown in FIG. 1. In this embodiment, the tailpiece receiver 23 engages with a tailpiece coupling 133 at the rear of the thumb turn 13, as can be seen in FIG. 3. This couples the thumb turn 13 and the tailpiece receiver 23 so that rotation of the thumb turn 13 rotates the tailpiece receiver 23. In this embodiment, the tailpiece coupling 133 includes a hexagonal opening that receives a hexagonal portion of the tailpiece receiver 23 to rotationally fix the tailpiece receiver 23 with respect to the thumb turn 13. Of course other arrangements are possible. For example, the tailpiece receiver 23 may be made integrally with or otherwise attached to the thumb turn 13 and need not necessarily be made separable from the thumb turn 13. As will be understood, the tailpiece receiver 23 may be arranged to accept differently sized and/or shaped tailpieces 22 so that the door lock 1 can be used with different lock mechanisms. The tailpiece receiver 23 may be made replaceable and/or adaptable to allow for a desired range of different tailpiece or other lock mechanism engagement parts. Also, where the door lock 1 is mounted over an existing lock thumb turn, the tailpiece receiver 23 may be arranged to couple with the exiting thumb turn. For example, the tailpiece receiver 23 may be arranged with a suitably sized and shaped recess to fit over the existing thumb turn and rotate the existing thumb turn based on rotation of the thumb turn 13.

While the door lock 1 in this embodiment allows a user to manually move a lock mechanism between lock and unlock positions using the thumb turn 13, the door lock 1 may include a drive train with a motor drive function that allows the lock mechanism to be moved automatically between lock and unlock positions, e.g., in response to wireless signals from a user device such as a smartphone. For example, a lock drive may be provided to drive rotation of the tailpiece 22, an existing thumb turn, or other lock mechanism engagement part. The lock drive may include the tail piece receiver 23 and the drive train may be arranged to move the tail piece receiver 23. As an example, a drive wheel may be coupled to the tailpiece receiver 23 via the thumb turn 13, e.g., the drive wheel may be fixed to the thumb turn 13, and the motor may be arranged to rotate the drive wheel, and thus a coupled tailpiece 22 and lock mechanism, between lock and unlock positions. In some cases, the drive train may include a motor and transmission (e.g., one or more gears driven by the motor and engaged with the drive wheel) to move the lock drive. Control of the drive train may be performed by any suitable control circuitry, which may include a programmed general purpose computer and/or other data processing device along with suitable software or other operating instructions, one or more memories (including non-transient storage media that may store software and/or other operating instructions), a power supply 12 for the control circuitry and/or other system components, position and other sensors, wireless communication devices to allow the control circuitry to receive and send signals with respect to user devices such as a smartphone or wireless router, input/output interfaces (e.g., such as the user interface to display information to a user and/or receive input from a user), communication buses or other links between components of the door lock 1, a display, switches, relays, triacs, motors, mechanical linkages and/or actuators, or other components necessary to perform desired input/output or other functions.

Figure 5:
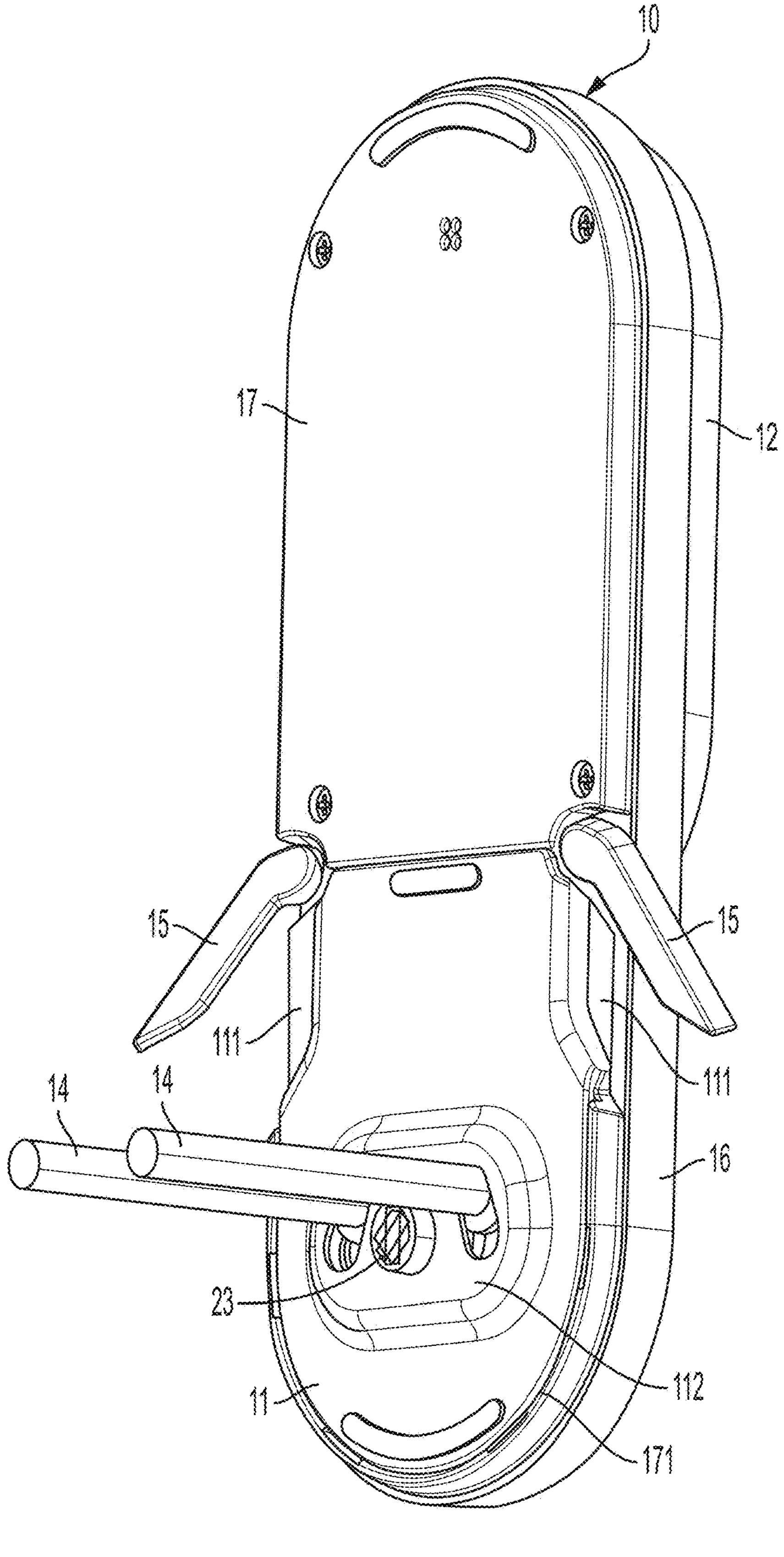
FIG. 5 is a rear perspective view of the FIG. 1 embodiment with latches disengaged from a mounting bracket.

In accordance with an aspect of the invention, the door lock may include a latch that is manually movable, e.g., without tools, to attach the door lock body to the mounting bracket. For example, FIG. 4 shows a rear perspective view of the door lock 1, and illustrates a pair of latches 15 that are pivotally mounted to opposite sides of the body 10 and adapted to selectively engage with the mounting bracket 11. In FIG. 4, the latches 15 are pivoted inwardly to a closed position so that catches on each of the latches 15 engage a respective tab of the mounting bracket 11 to secure the base 17 and cover plate 16 to the mounting bracket 11. As can be seen generally in FIGS. 1 and 4, when the latches 15 are in a closed position, the latches 15 are positioned within an outer periphery of the body 10, e.g., when the door lock 1 is viewed from the front, the latches 15 do not protrude outwardly from the side portions of the body 10. When the latches 15 are pivoted outwardly to an open position as shown in FIG. 5, the latches 15 are extended laterally from the outer periphery of the body 10 so the latches 15 disengage tabs 111 of the mounting bracket 11, thus disengaging the body 10 from the mounting bracket 11. To mount the door lock 1 to a door or other surface, the mounting bracket 11 may first be separated from the body 10 and attached to the door. The mounting bracket 11 may be attached to the door in a variety of different ways, such as by adhesive, fasteners, magnets, etc. In this embodiment, the mounting bracket 11 includes a lock mechanism engaging portion 112 that has a pair of openings and pins 14 used to engage a lock mechanism. The pins 14 may include a male or female threaded portion that threadedly engages with a corresponding fastener to secure the mounting bracket 11 to a lock cylinder, cover plate or other lock mechanism structure. With the mounting bracket 11 attached to the door, the latches 15 may be pivoted to the open position and the body 10 may be positioned over the mounting bracket 11 so that mounting bracket 11 is received into a corresponding recess 171 in the base 17 and the latches 15 are appropriately positioned relative to tabs 111 of the mounting bracket 11. The latches 15 may then be pivoted inwardly to the closed position as in FIG. 4 to attach the body 10 to the mounting bracket 11, and thus to the door. Engaging of the latches 15 with the tabs 111 captures the tabs 111 and potentially other portions of the mounting bracket 11 between the latch 15 and the body 10. In some embodiments, the latches 15 may be moved to the closed position by a user with a thumb and fingers of one hand, which may provide a particularly easy way to attach the body 10 to a door.

Figure 6:
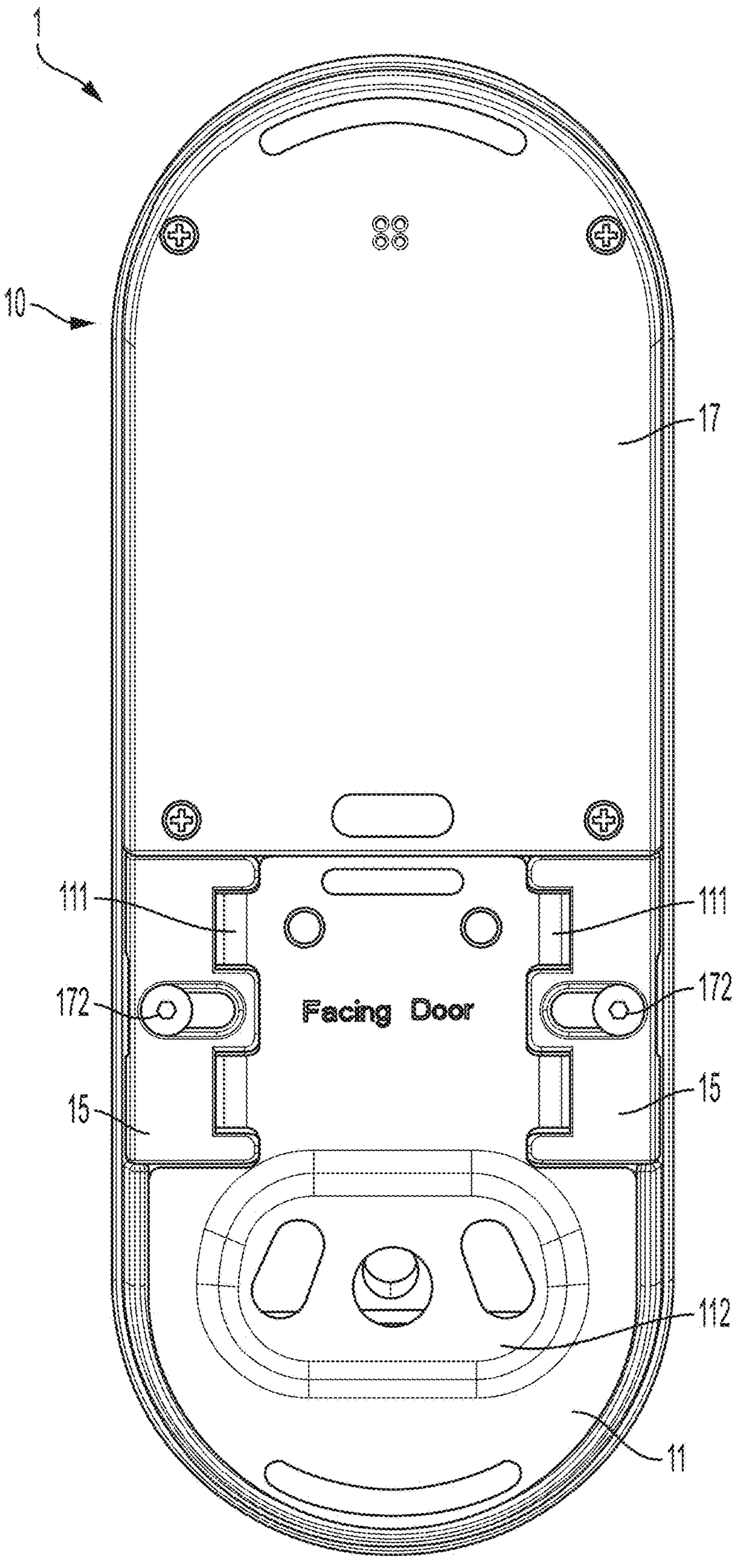
FIG. 6 is a rear view of another door lock embodiment having slidably movable latches.
Figure 7:
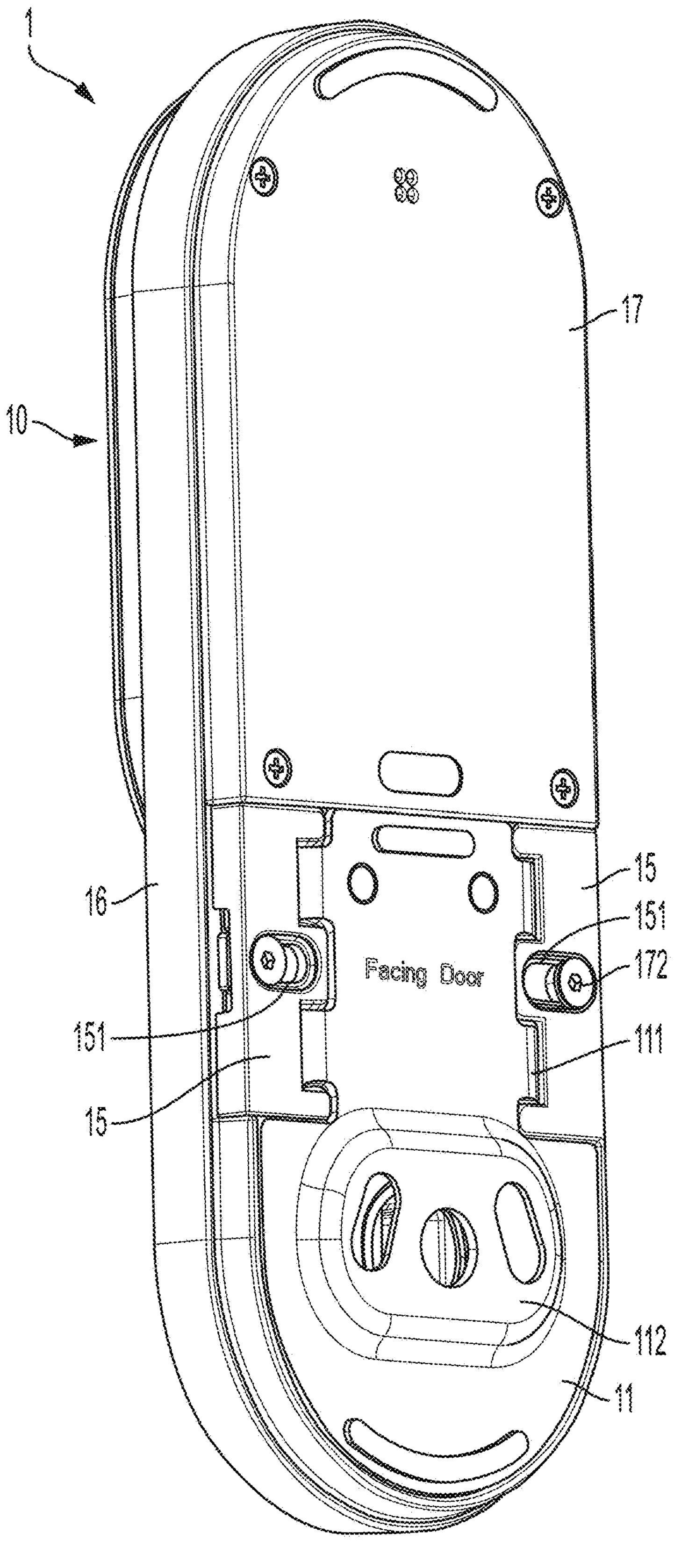
FIG. 7 is a rear perspective view of the FIG. 6 embodiment.
Figure 8:
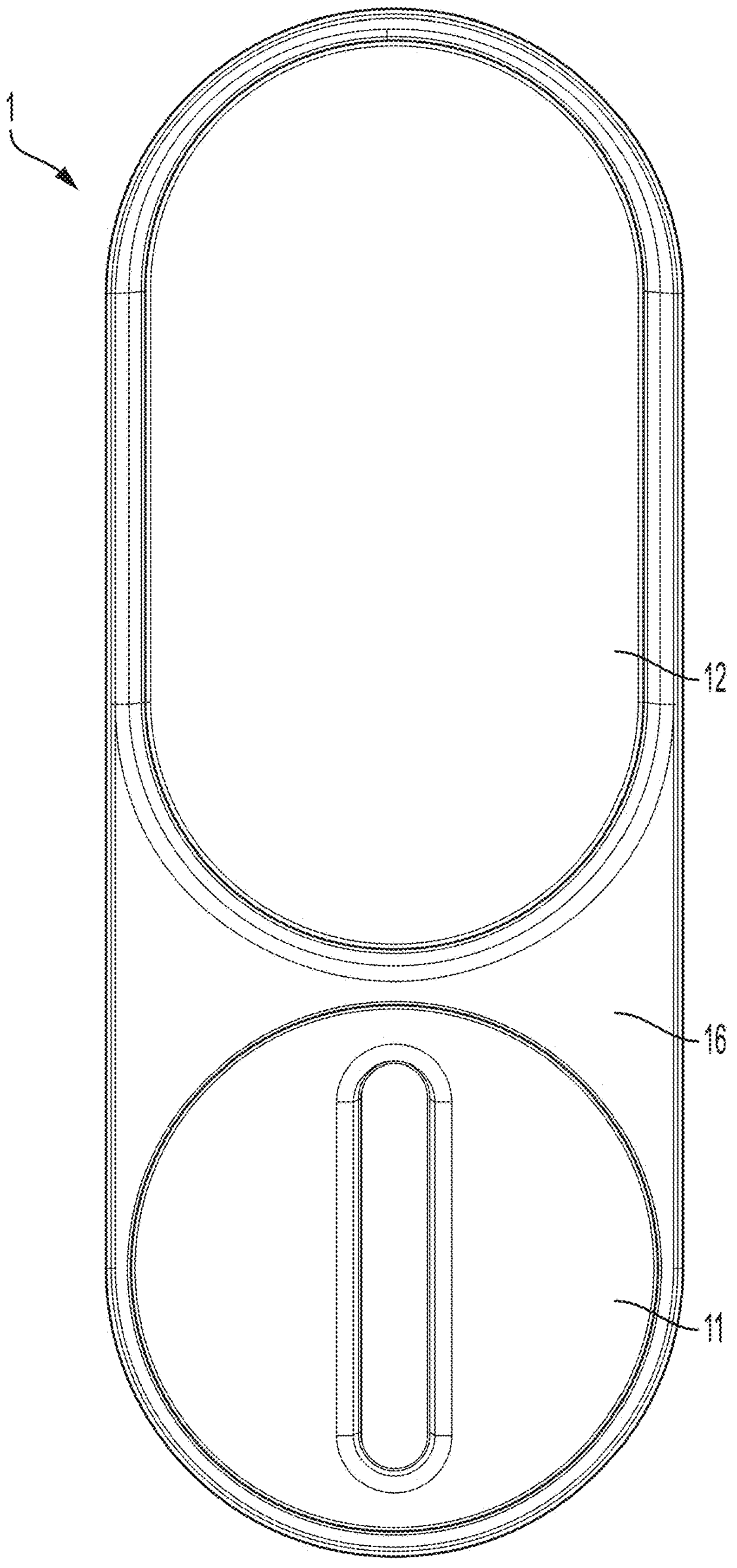
FIG. 8 is front view of the FIG. 6 embodiment.
Figure 9:
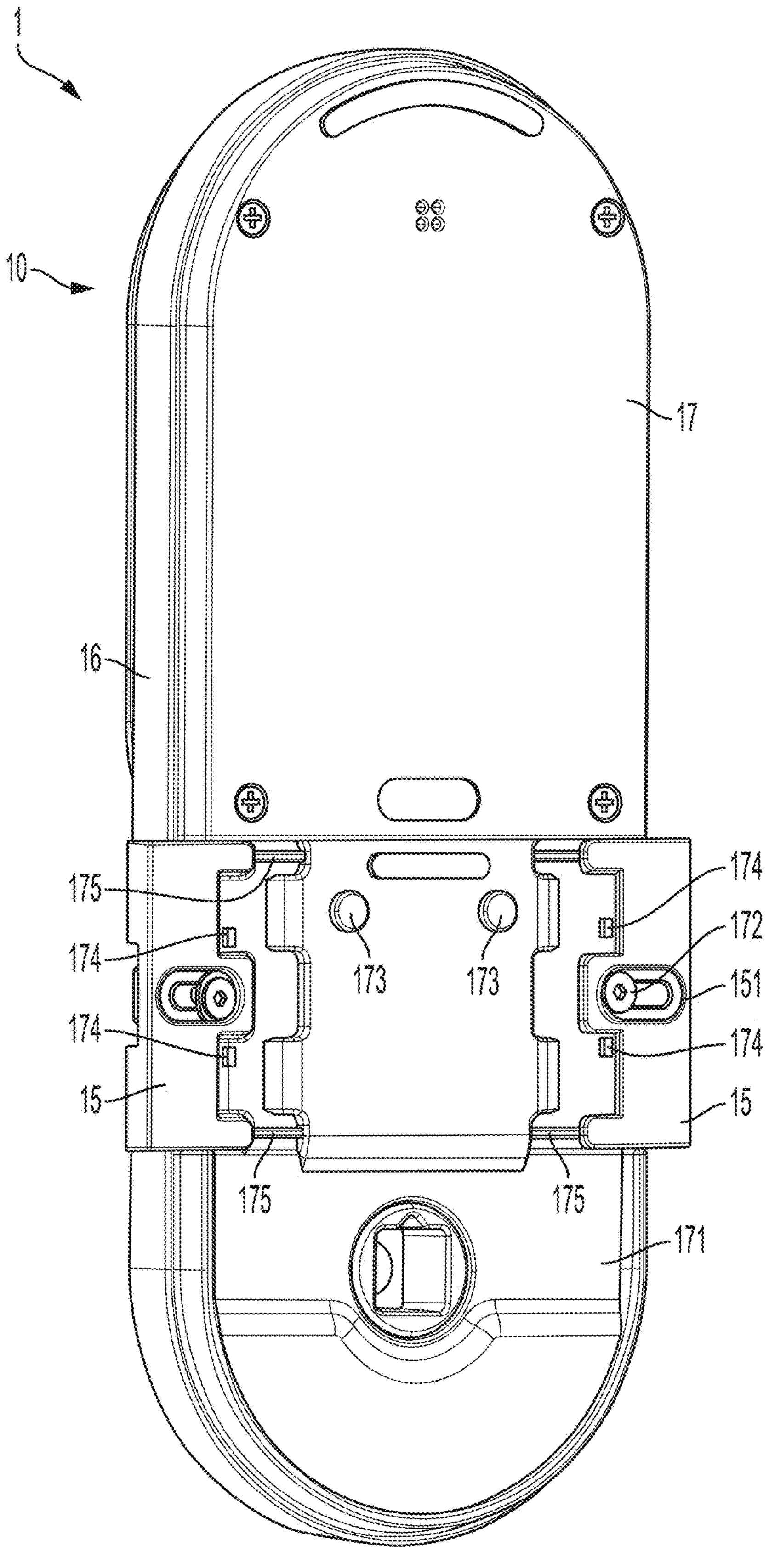
FIG. 9 is a rear perspective view of the FIG. 6 embodiment with latches in an open position.
Figure 10:
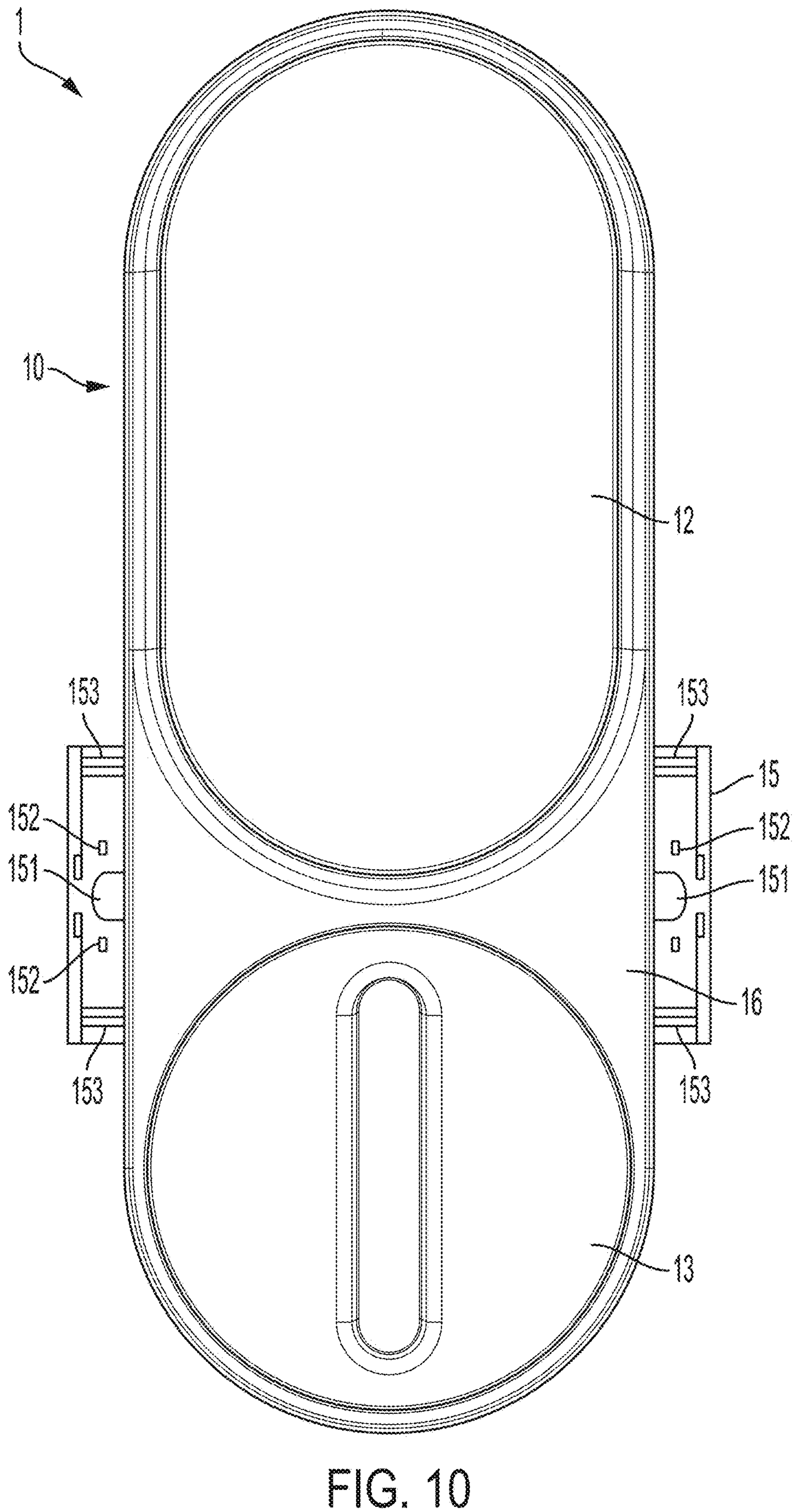
FIG. 10 is a front view of the FIG. 6 embodiment with latches in an open position.

While FIGS. 1-4 show an embodiment in which latches 15 are pivotally mounted to the body 10, other arrangements for latches 15 are possible. For example, a latch may be moved linearly or along other paths than moved pivotally between open and closed positions, a latch may be mounted to a mounting bracket rather than the door lock body, and/or a latch may not be mounted to either a mounting bracket or body and instead may be separate from both elements. In one illustrative embodiment, one or more latches may be slidable or movable along a linear path to engage and disengage a lock body and mounting bracket. For example, FIG. 6 shows a rear view and FIG. 7 shows a rear perspective view of a door lock 1 in which latches 15 are movable laterally, e.g., in a plane of a door or other surface to which the lock 1 is mounted, between open and closed positions. FIGS. 6 and 7 show the latches 15 in a closed position in which tabs 111 of the mounting bracket 11 are engaged by catches of the latches 15, e.g., the tabs 111 are captured between the latches 15 and the body 10 to engage the body 10 with the mounting bracket 11. As can be seen in the front view of the door lock 1 in FIG. 8, with the latches 15 in the closed position, the latches 15 are positioned within an outer periphery of the body 10. The latches 15 are mounted to the body 10 by fasteners 172 that are fixed relative to the body 10. The fasteners 172 are received in respective elongated slots 151 of the latches 15 so that the latches 15 are slidably movable in a lateral direction relative to the body 10, e.g., in a plane of the surface to which the lock 1 is mounted. FIG. 9 shows a rear perspective view and FIG. 10 shows a front view of the door lock 1 with the latches 15 in an open position in which tabs 111 of the mounting bracket 11 are disengaged and the body 10 is removable from the mounting bracket 11. In fact, FIG. 9 shows the mounting bracket 11 removed from the recess 171 of the body 17 into which the mounting bracket 11 is receivable. In this embodiment, the base 17 includes posts 173 that are received into corresponding openings of the mounting bracket 11 when the mounting bracket 11 is received into the recess 171 of the base 17. Engagement of the posts 173 with the mounting bracket openings may help suitably position the mounting bracket 11 relative to the base 17 and/or help prevent unwanted movement of the body 10 relative to the mounting bracket 11. FIG. 10 illustrates how the latches 15 are extended laterally from the outer periphery of the body 10 on opposite sides of the body 10 when the latches 15 are in the open position. In this embodiment, the latches 15 may be moved toward each other to move from the open position to the closed position, and this movement may be effected by a user with thumb and fingers of one hand, e.g., squeezing the latches 15 toward each other to attach the body 10 to the mounting bracket 11.

In this embodiment, a detent is provided to hold the latches 15 in the closed position relative to the body. However, such a detent is not required, and/or a detent may be provided to hold the latches 15 in the open position in addition, or alternately, to the closed position. In this embodiment, the detent includes a pin 152 on the latches 15 (see FIG. 10) which engages with a corresponding groove 174 (see FIG. 9) on the body 10. The pins 152 may be made suitably flexible to releasably engage the grooves 174, e.g., so the latches 15 are held in the closed position until a suitably large force is exerted on the latches 15 to move them toward the open position, at which point the pins 152 disengage from the grooves 174. Other detent arrangements are possible, such as a spring-loaded ball and groove, a pawl and ratchet, etc.

In some embodiments, a latch may be guided in movement relative to the body and/or mounting bracket between open and closed positions. For example, FIGS. 9 and 10 show that the latches 15 include grooves 153 (see FIG. 10) that receive rails 175 (see FIG. 9) of the base 17 so that the latches 15 are guided in motion relative to the body 10. The elongated slots 151 extend in a same direction as the grooves 153 to allow for desired movement, and the slots 151 may limit the extent of travel of the latches 15 relative to the body 10. That is, the length of the slots 151 and engagement of the slots 151 with the fasteners 172 may limit the extent to which the latches 15 are moveable relative to the body 10. Other arrangements are possible for guiding movement of a latch, such as reversing the relative positions of the rail and groove, providing a pocket in the base 17 into which a latch 15 moves, etc.

Figure 11:
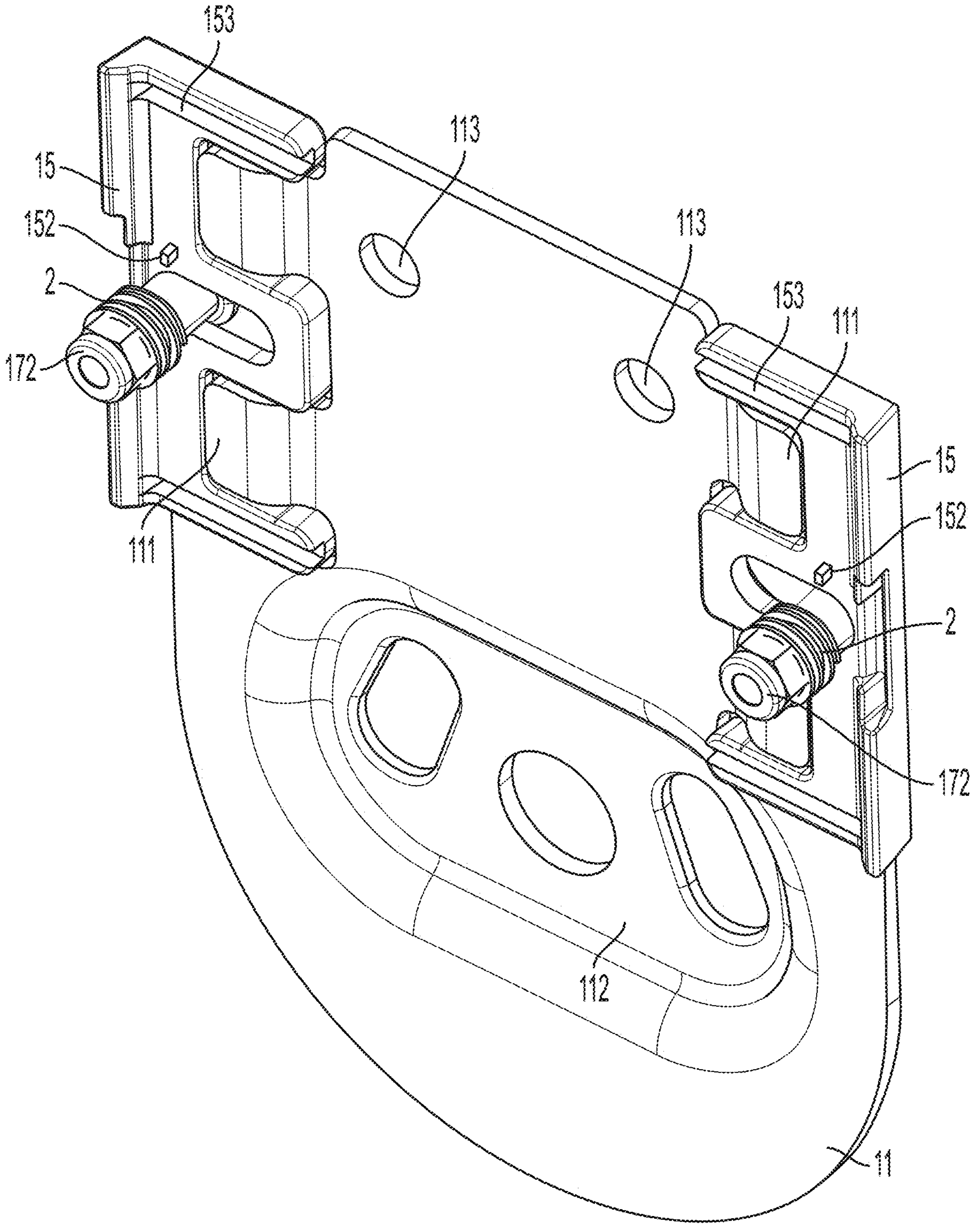
FIG. 11 shows a front right perspective view of the latches and mounting bracket of the FIG. 6 embodiment.

FIG. 11 shows a front right perspective view of the latches 15 and mounting bracket 11 of the FIGS. 6-10 embodiment with the body 10 removed for clarity. The fasteners 172 are normally fixed to the base 17 and so attach the latches 15 to the base 17. In this embodiment, springs 2 are provided at each fastener 172 to bias the latches 15 rearwardly and away from the body 10. That is, the latches 15 are mounted to the rear side of the body 10, and the springs 2 bias the latches 15 away from the rear side of the body 10. This spring bias may help properly position the latches 15 so that tabs 111 of the mounting bracket 11 may be caught by catches on the latches 15 so the tabs 111 are positioned between the latches 15 and the body 10. FIG. 11 also shows openings 113 of the mounting bracket 11 that may engage with posts 173 of the base 17 when the mounting bracket 11 is engaged with the body 10.

Figure 12:
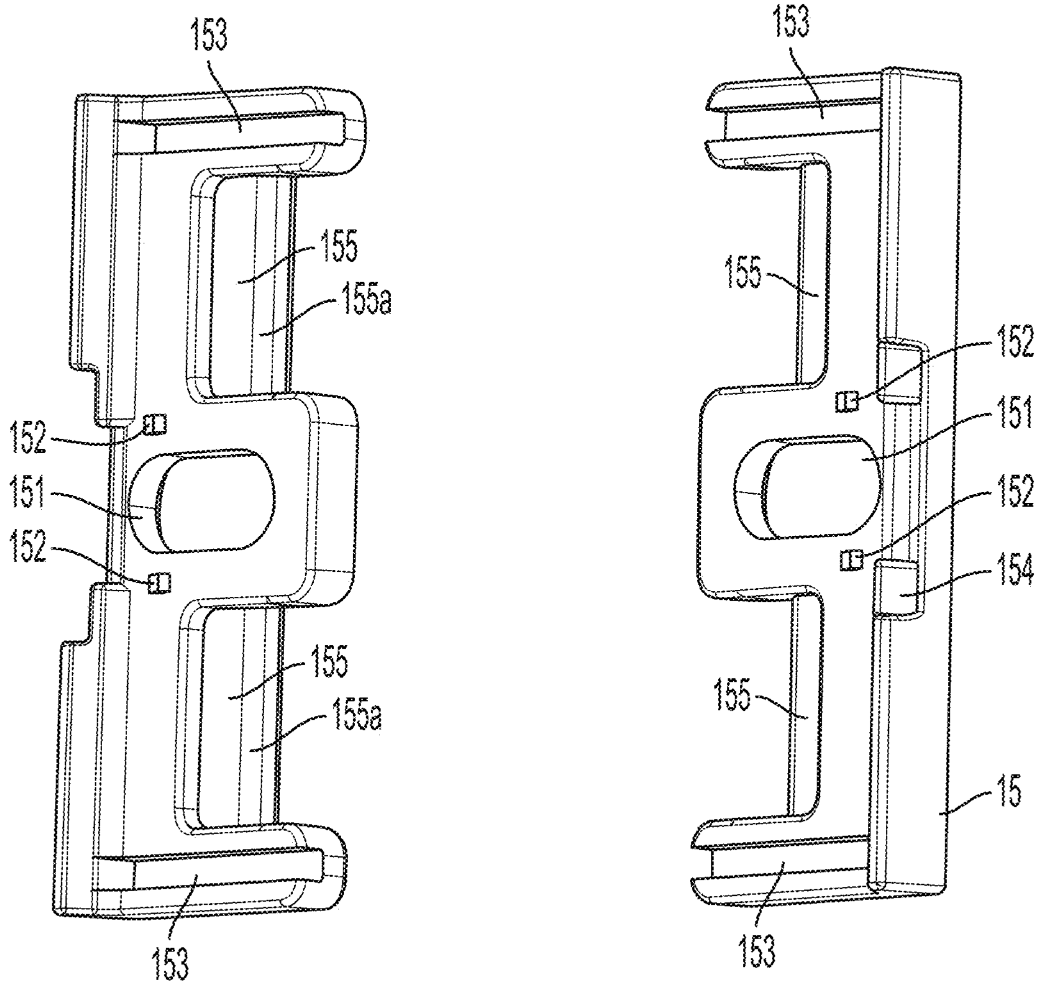
FIG. 12 shows a front right perspective view of the latches of the FIG. 6 embodiment.

FIG. 12 shows a front right perspective view of the latches 15 and illustrates the catches 155 used to engage corresponding tabs 111 of the mounting bracket 11. In this embodiment, the catches 155 include a recess formed in the latch 15 that includes a ramp or sloped leading edge 155*a* to aid in engagement of a corresponding tab 111. For example, the ramp 155*a* may help guide a tab 111 into the catch 155 if the latch 15 and tab 111 are not precisely aligned. FIG. 12 also shows tabs 154 provided on a lateral side of the latches 15 that may be engaged by a tool to move the latches 15 from the closed position to the open position. Use of a tool to move the latches 15 from the closed position may be helpful, e.g., because the latches 15 may be recessed or flush with respect to the base 17 and cover 16 in the closed position, making gripping of a latch 15 by hand difficult. In addition, or alternately, a detent used to hold the latch in the closed position may provide resistance to movement of the latch from the closed position, and may require use of a tool to move the latch. The tabs 154 may be accessible at a side of the door lock 1, e.g., a screwdriver blade may be inserted behind a tab 154 and used to pry the latch 15 outwardly from the closed position.

Figure 13:
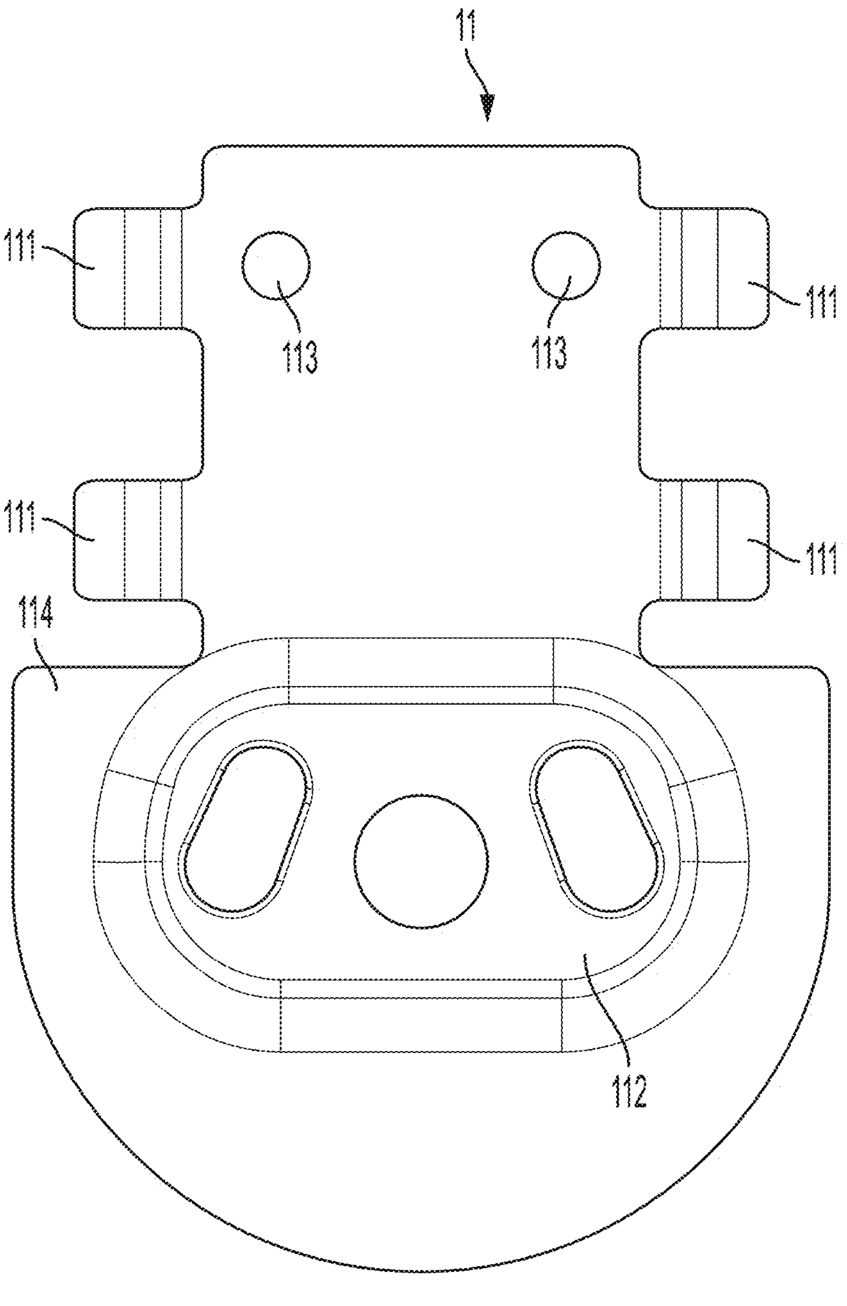
FIG. 13 is a front view of the mounting bracket of the FIG. 6 embodiment.
Figure 14:
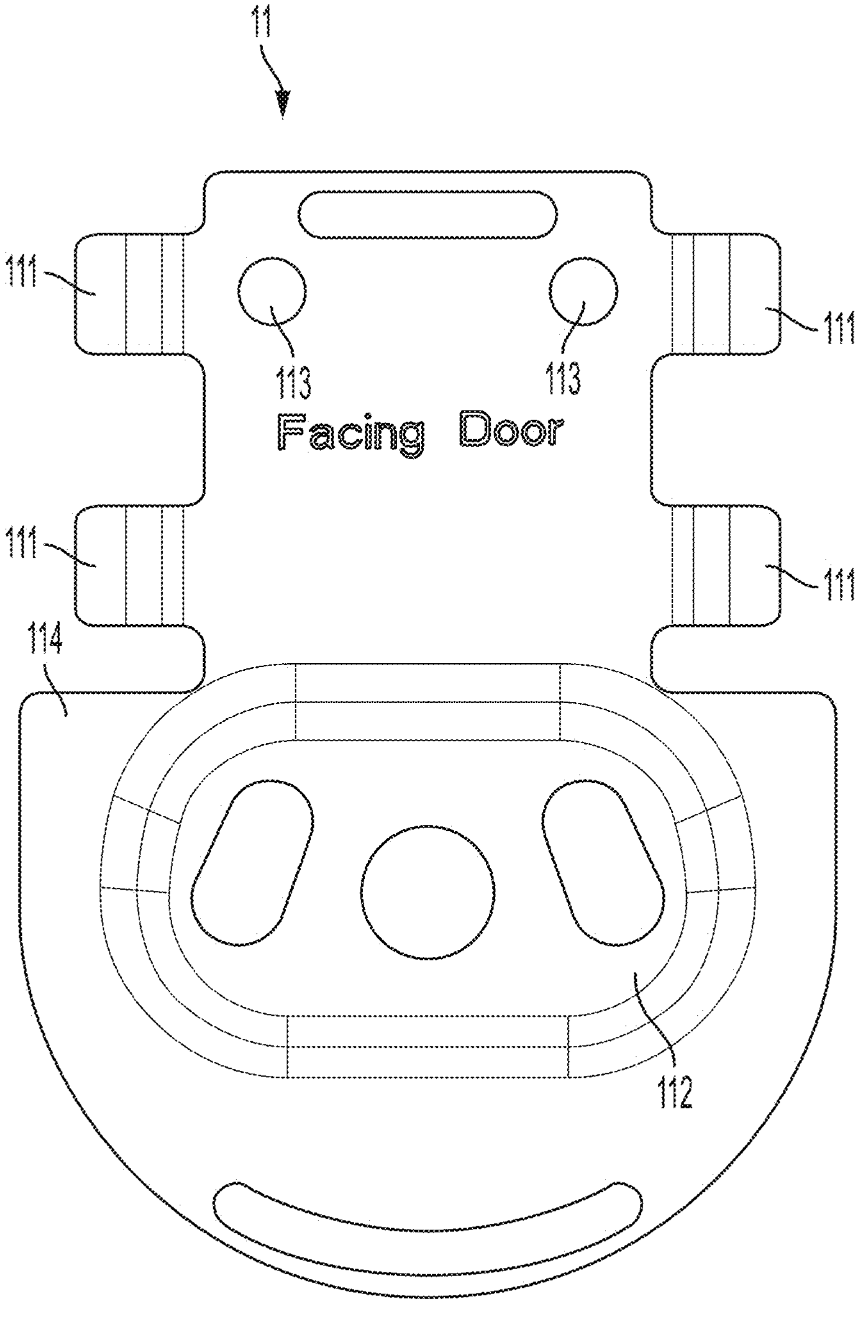
FIG. 14 is a rear view of the mounting bracket of the FIG. 6 embodiment.
Figure 15:
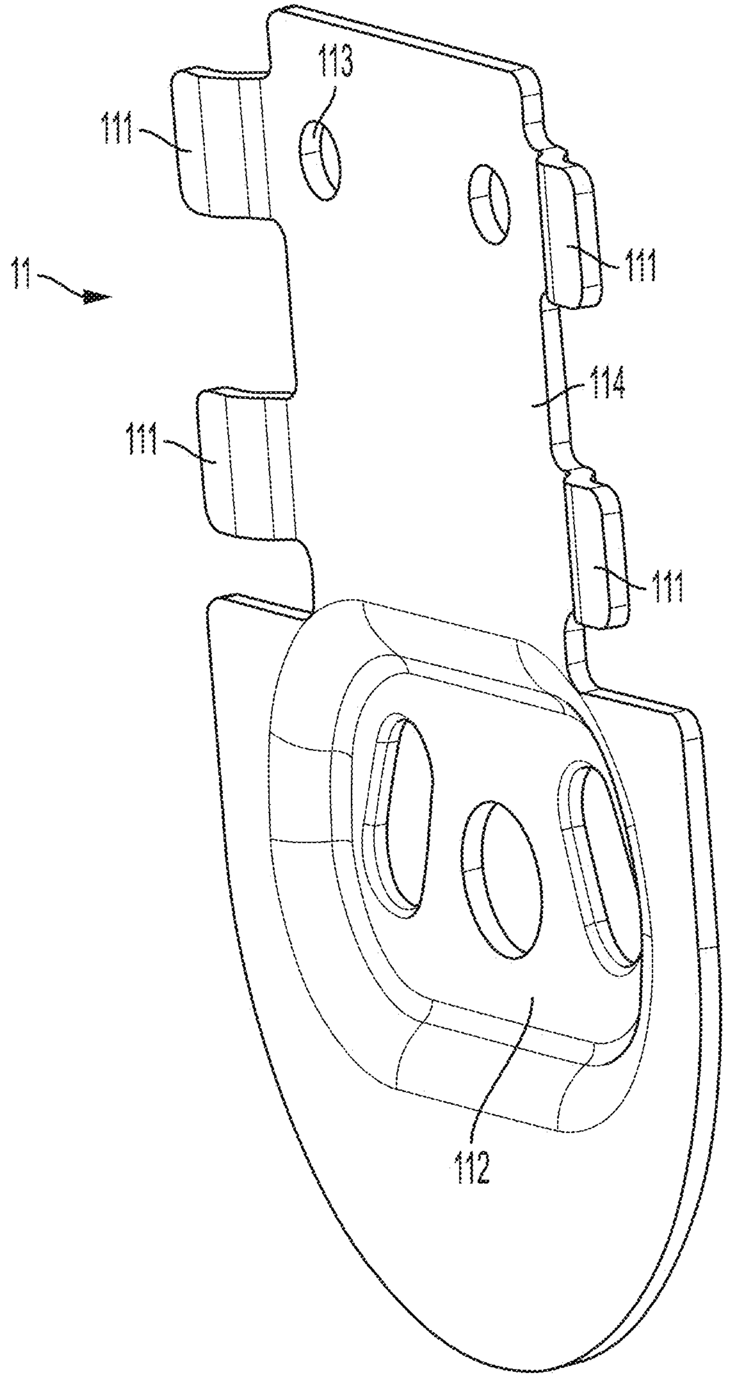
FIG. 15 is a front perspective view of the mounting bracket of the FIG. 6 embodiment.

FIGS. 13-15 show front, rear and front perspective views of the mounting bracket 11 of the FIG. 6 embodiment. These figures illustrate that the mounting bracket 11 includes a plate 114 arranged in a first plane, and having a surface, e.g., the rear side of the plate 114, that is adapted to be positioned against or otherwise adjacent to a door surface to which the lock 1 is mounted. The tabs 111 may be arranged above the first plane of the plate 114, e.g., extending forwardly relative to the plate 114 so the tabs 111 can be caught between the latches 15 and the body 10. The lock mechanism engagement portion 112 may be positioned below the first plane of the plate 114, e.g., rearwardly of the plate 114 so the engagement portion 112 may be at least partially received into an opening of a door where a lock mechanism is located. The engagement portion 112 in this embodiment includes openings for the mounting pins 14 and to allow the tailpiece 22 to pass through the mounting bracket 11, but other arrangements are possible, e.g., depending on how the lock mechanism is arranged and/or how the mounting bracket 11 is secured to a door. While in this embodiment the mounting bracket 11 includes four tabs 111, any suitable number of tabs 111 may be used, e.g., one on each lateral side of the bracket 11. Also, this embodiment employs two latches 15, but a single latch 15 may be used, and in such a case, a single tab 11 may be used. In a single latch embodiment, the mounting bracket 11 may include a hook or other feature on one lateral side that engages with an opening or other feature of the body 10. A tab may be provided on a side opposite the hook (or opening or other feature) and engaged by the single latch.

While aspects of the invention have been described with reference to various illustrative embodiments, such aspects are not limited to the embodiments described. Thus, it is evident that many alternatives, modifications, and variations of the embodiments described will be apparent to those skilled in the art. Accordingly, embodiments as set forth herein are intended to be illustrative, not limiting. Various changes may be made without departing from the spirit of aspects of the invention.

The invention claimed is:

1. A door lock comprising:

a mounting bracket adapted to be mounted to a first side of a door, the mounting bracket comprising a planar bracket body having first and second tabs extending from opposing lateral sides of the planar bracket body;

a cover body having a planar front face with a rearwardly-extending peripheral flange adapted to be mounted to the first side of the door by attachment to the mounting bracket on the first side of the door with the peripheral flange surrounding the mounting bracket;

first and second latches slidably mounted within a channel disposed within the front face of the cover body on opposing lateral sides of the cover body and manually movable toward each other relative to the mounting bracket and the cover body to engage first and second catches of the first and second latches, respectively, with a corresponding one of the first and second tabs to attach the cover body to the mounting bracket;

a lock drive rotatably mounted within the cover body and adapted to move a lock mechanism between locked and unlocked positions; and a thumb turn rotatably mounted within the front face of the cover body and adapted for manual movement between at least two positions, the thumb turn being coupled to the lock drive such that rotation of the thumb turn moves the lock drive;

wherein the cover body has a rail to guide movement of a corresponding groove of each of the first and second latches within the channel, and wherein the first and second latches each include an elongated slot to receive a fastener to slidably attach the first and second latches to the cover body.

2. The door lock of claim 1, wherein the thumb turn and lock drive are mounted to the cover body such that the thumb turn and lock drive are removable from the mounting bracket with the cover body when the cover body is removed from the mounting.

3. The door lock of claim 1, wherein the first and second latches are movable relative to the cover body in a plane of a door surface to which the mounting bracket is mounted.

4. The door lock of claim 1, wherein the first and second latches are movable relative to the cover body to capture the first and second tabs of the mounting bracket between the latch and the cover body.

5. The door lock of claim 1, wherein in an open position a portion of the first and second latches is extended laterally from an outer periphery of the cover body, and in a closed position the first and second latches are positioned within the outer periphery of the cover body.

6. The door lock of claim 1, wherein the first and second latches are movable relative to the cover body between open and closed positions, wherein in the open position a portion of the first and second latches is extended laterally from an outer periphery of the cover body, and in the closed position the first and second latches are positioned within the outer periphery of the cover body.

7. The door lock of claim 1, wherein the first and second latches are arranged to be movable toward each other using a thumb and finger of one hand.

8. The door lock of claim 1, further comprising a detent to hold the first and second latches in a closed position relative to the cover body.

9. The door lock of claim 8, wherein the detent includes a pin on the first and second latches and a groove on the cover body, and wherein the pin and groove are adapted to engage each other with the first and second latches in the closed position.

10. The door lock of claim 1, further comprising a spring adapted to bias the first and second latches away from the cover body.

11. The door lock of claim 10, wherein the first and second latches are mounted to a rear side of the cover body and the spring biases the first and second latches away from the rear side of the cover body.

12. The door lock of claim 11, wherein the thumb turn is located at a front side of the body opposite the rear side of the cover body.

13. The door lock of claim 11, wherein the rear side of the cover body is adapted for positioning adjacent a surface of a door to which the door lock is mounted.

14. The door lock of claim 1, wherein the mounting bracket includes a plate arranged in a first plane, and the first and second tabs are attached to the plate and positioned above the first plane.

15. The door lock of claim 14, wherein the mounting bracket includes a lock mechanism engaging portion that is positioned below the first plane and adapted to secure the mounting bracket to a door to which the door lock is mounted.

* * * * *